(12) United States Patent
Lee et al.

(10) Patent No.: US 7,560,181 B2
(45) Date of Patent: Jul. 14, 2009

(54) FUEL CELL SYSTEM AND METHOD OF OPERATING THE SAME

(75) Inventors: Hyun-chul Lee, Yongin-si (KR); Duk-jin Oh, Yongin-si (KR); Tae-won Song, Yongin-si (KR); Dong-kwan Kim, Yongin-si (KR); Yong Wang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/834,197

(22) Filed: Aug. 6, 2007

(65) Prior Publication Data

US 2008/0160355 A1 Jul. 3, 2008

(30) Foreign Application Priority Data

Dec. 29, 2006 (KR) .................... 10-2006-0138637

(51) Int. Cl.
*H01M 8/00* (2006.01)
*H01M 8/04* (2006.01)
*H01M 8/12* (2006.01)

(52) U.S. Cl. ...................... 429/12; 429/13; 429/24; 429/26

(58) Field of Classification Search ............... 429/12, 429/24
See application file for complete search history.

(56) References Cited

U.S. PATENT DOCUMENTS

| | | | |
|---|---|---|---|
| 6,312,842 B1* | 11/2001 | Reiser et al. ............. | 429/13 |
| 2002/0155331 A1* | 10/2002 | Kamegaya et al. ....... | 429/19 |
| 2005/0255352 A1* | 11/2005 | Matoba .................... | 429/22 |

* cited by examiner

*Primary Examiner*—Dah-Wei D Yuan
*Assistant Examiner*—Alexander Chuang
(74) *Attorney, Agent, or Firm*—Stein McEwen, LLP

(57) ABSTRACT

A fuel cell system includes a first heating structure that increases an internal temperature of the stack by passing exhaust gas of the process burner through the stack; and a second heating structure that increases the internal temperature of the stack by passing heated cooling water through the stack after the cooling water is heated by heat exchange with the exhaust gas of the process burner. Accordingly, when rapid heating of a stack is necessary like during a start up operation, a time required for the fuel cell system to reach a normal operation can be greatly reduced since the stack can be simultaneously heated using high temperature exhaust gas and heated cooling water.

7 Claims, 5 Drawing Sheets

FUEL CELL SYSTEM AND METHOD OF OPERATING THE SAME

CROSS-REFERENCE TO RELATED APPLICATION

This application claims the benefit of Korean Application No. 2006-138637, filed Dec. 29, 2006, in the Korean Intellectual Property Office, the disclosure of which is incorporated herein by reference.

BACKGROUND OF THE INVENTION

1. Field of the Invention

Aspects of the present invention relate to a fuel cell system and a method of operating the same. More particularly, aspects of the present invention relate to a fuel cell system that can rapidly increase an internal temperature of a stack during a start up operation and a method of operating the same.

2. Description of the Related Art

A fuel cell is an electricity generator that changes chemical energy of a fuel into electrical energy through a chemical reaction. A fuel cell can continuously generate electricity as long as fuel is supplied. FIG. 1 is a schematic drawing illustrating the energy transformation structure of a conventional fuel cell. Referring to FIG. 1, when air, which contains oxygen, is supplied to a cathode 1 of a unit cell 10, and a fuel that contains hydrogen is supplied to an anode 3, electricity is generated by a reverse reaction of water electrolysis through an electrolyte membrane 2. However, the electricity generated by a single unit cell typically does not have a high enough voltage for practical use. Therefore, electricity is typically generated by a fuel cell stack 100 in which a plurality of unit cells 10 are connected in series, as depicted in FIG. 2. As depicted in FIG. 3, flow channels including surface flow channels 4a of a bipolar plate 4 for supplying hydrogen or oxygen to the anode and cathode electrodes 1 and 3 are connected in each of the unit cells 10 stacked in the stack 100. Accordingly, when hydrogen and oxygen are supplied to the stack 100 as depicted in FIG. 2, corresponding elements are supplied to the corresponding electrodes and are circulated through the flow channels of each of the unit cells 10.

In an electrochemical reaction, electricity and heat are generated. Therefore, for a smooth operation of a fuel cell, a fuel cell typically must be continuously cooled by dissipating the generated heat. Thus, in the fuel cell stack 100, a cooling plate 5 that passes cooling water for heat exchange is mounted on every 5th or 6th unit cell 10 in the stack 100. Thus, the cooling water absorbs heat in the stack 100 while passing through flow channels 5a of the cooling plate 5. The cooling water that has absorbed heat is cooled in the heat exchanger H5 (refer to FIG. 4) by secondary cooling water, and is circulated back to the stack 100.

In a fuel cell, a hydrocarbon such as a natural gas is used as a fuel source to supply hydrogen to the fuel cell stack 100. Hydrogen is produced from the fuel source in a fuel processor 200, as depicted in FIG. 4, and is supplied to a stack 100.

The fuel processor 200 includes a desulfurizer 210, a reformer 220, a burner 230, a water supply pump 260, first and second heat exchangers H1 and H2, and a carbon monoxide (CO) removing unit 250 consisting of a CO shift reactor 251 and a CO remover 252. The hydrogen generation process is performed in the reformer 220. That is, hydrogen is generated in the reformer 220 heated by the burner 230 through a chemical reaction between a hydrocarbon gas, which is the fuel source entering from a fuel tank 270, and steam that is supplied from a water tank 280 through the water supply pump 260. At this point, $CO_2$ and CO are generated as by products. At this point, the generated CO should be removed, because if a fuel containing 10 ppm or more of CO is supplied to the stack 100, the electrodes are poisoned, resulting in a rapid reduction of the performance of the fuel cell. Therefore, the content of CO in the fuel at an outlet of the reformer 220 is controlled to be 10 ppm or less by passing the reaction products of the reformer 220 through the CO shift reactor 251 and the CO remover 252. A chemical reaction to generate $CO_2$ by reacting CO and steam occurs in the CO shift reactor 251, and an oxidation reaction by directly reacting CO with oxygen occurs in the CO remover 252. The CO content in the fuel that has passed through the CO shift reactor 251 is 5,000 ppm or less and the CO content in the fuel that has passed through the CO remover 252 is reduced to 10 ppm or less. The desulfurizer 210 located at an inlet of the reformer 220 removes sulfur components contained in the fuel source. Sulfur components can easily poison the electrodes of a fuel cell if levels as low as 10 parts per billion (ppb) or more are supplied to the stack 100.

When a fuel cell system having the fuel processor 200 and the stack 100 is operating, hydrogen is generated in the fuel processor 200 through the process described above, and an electrochemical reaction occurs using the hydrogen as a fuel in the stack 100. In FIG. 4, a simplified stack 100 is depicted. However, as described with reference to FIG. 3, hydrogen passes through corresponding flow channels to contact anode electrodes. Air, which is a source of oxygen, passes through corresponding flow channels to contact cathode electrodes. As shown in FIG. 4, a process burner 110 is operated using surplus hydrogen that is not consumed in the stack 100. Secondary cooling water that has heat exchanged with the cooling water that is circulating through the stack 100 can be sent to the water storage for use as warm water. However, the temperature of the secondary cooling water is not high enough to be a significant source of warm water. Therefore, recently, a fuel cell system having a structure in which the process burner 110 that uses surplus hydrogen has been generally employed. The process burner 110 heats water, and the heated water is stored in a warm water storage 120 for using warm water for extraneous uses.

In order to have a efficient electrochemical reaction in the stack 100, the interior of the stack 100 must be maintained at an appropriate temperature. For example, a normal operating temperature of the stack 100 may be 120° C. However, during a start up operation of a fuel cell system, it takes time for the stack 100 to reach the normal operating temperature. During the start up operation of a fuel cell system, to increase the temperature of the stack 100, a cooling water tank 130 may be heated using an electric heater, so that the temperature of the stack 100 may be increased by circulating the heated water. Of course, when the stack 100 reaches the normal temperature and the normal electrochemical reaction begins to occur, the temperature of the stack 100 rises due to an exothermic reaction. But, during the start up operation, the interior of the stack 100 is heated to an appropriate temperature by circulating heated cooling water using an electric heater. However, when the stack 100 is heated using the heated cooling water, it takes approximately one hour to heat the stack 100 from room temperature to the normal operating temperature of, for example, 120° C. Accordingly, although the fuel processor 200 may ready to supply hydrogen to the stack 100 shortly after start up, it may not be possible to begin the operation of the fuel cell stack 100 until one hour later, when the temperature of the stack 100 has reached a normal operating temperature.

Accordingly, there is a need to develop a system that can rapidly heat the stack 100 during the start up operation in order to reduce the time required to reach a normal operation of a fuel cell system.

SUMMARY OF THE INVENTION

Aspects of the present invention provide a fuel cell system that can rapidly increase the internal temperature of a stack during a start up operation and a method operating the same.

According to an aspect of the present invention, there is provided a fuel cell system comprising: a stack in which an electrochemical reaction occurs between hydrogen and oxygen; a fuel processor that produces hydrogen to be supplied to the stack from a fuel source; a process burner that is operated using the fuel source or surplus hydrogen that was not consumed in the stack and that generates a process burner exhaust gas; a first heating structure that increases an internal temperature of the stack by passing exhaust gas of the process burner through the stack. The fuel cell system may also include a cooling water circulating unit for cooling the stack and a second heating structure that increases the internal temperature of the stack by heating cooling water by heat exchange with the process burner exhaust gas and passing the heated cooling water through the stack.

The first heating structure may comprise an exhaust gas connection line that connects an exhaust gas flow line of the process burner to hydrogen and oxygen flow lines and at least one valve such that the exhaust gas is selectively directed through the stack or directed to a process burner exhaust outlet.

The second heating structure may comprise a cooling water connection line that separates the cooling water from the main cooling water line of the cooling water circulating unit for heat exchange with the process burner exhaust gas and that circulates the heated cooling water to the main cooling water line such that the heated cooling water is directed into the stack and at least one cooling water valve such that the cooling heated cooling water selectively passes through the stack by valve control.

According to an aspect of the present invention, there is provided a method of operating a fuel cell system, comprising: increasing an internal temperature of a fuel cell stack during a start up operation of the fuel cell system by passing a process burner exhaust gas through the fuel cell stack until the internal temperature of the fuel cell stack reaches a predetermined normal operating temperature. The method may also include stopping the passing of the process burner exhaust gas through the fuel cell stack when the internal temperature of the fuel cell stack reaches a predetermined normal operating temperature. The method may also include increasing the internal temperature of the fuel cell stack by passing a heated cooling water heated by heat exchange with the process burner exhaust gas through the fuel cell stack until the internal temperature of the fuel cell stack reaches the predetermined operating temperature and stopping the passing of the heated cooling water through the stack when the internal temperature of the stack reaches the predetermined normal operating temperature.

According to an aspect of the present invention, there is provided a method of increasing an internal temperature of a fuel cell stack during a start up operation of a fuel cell system comprising simultaneously passing a heated gas through hydrogen and oxygen flow lines of the fuel cell stack and passing heated water through cooling plates of the fuel cell stack until the internal temperature of the fuel cell stack reaches a predetermined normal operating temperature.

The predetermined normal operating temperature may be 120° C.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
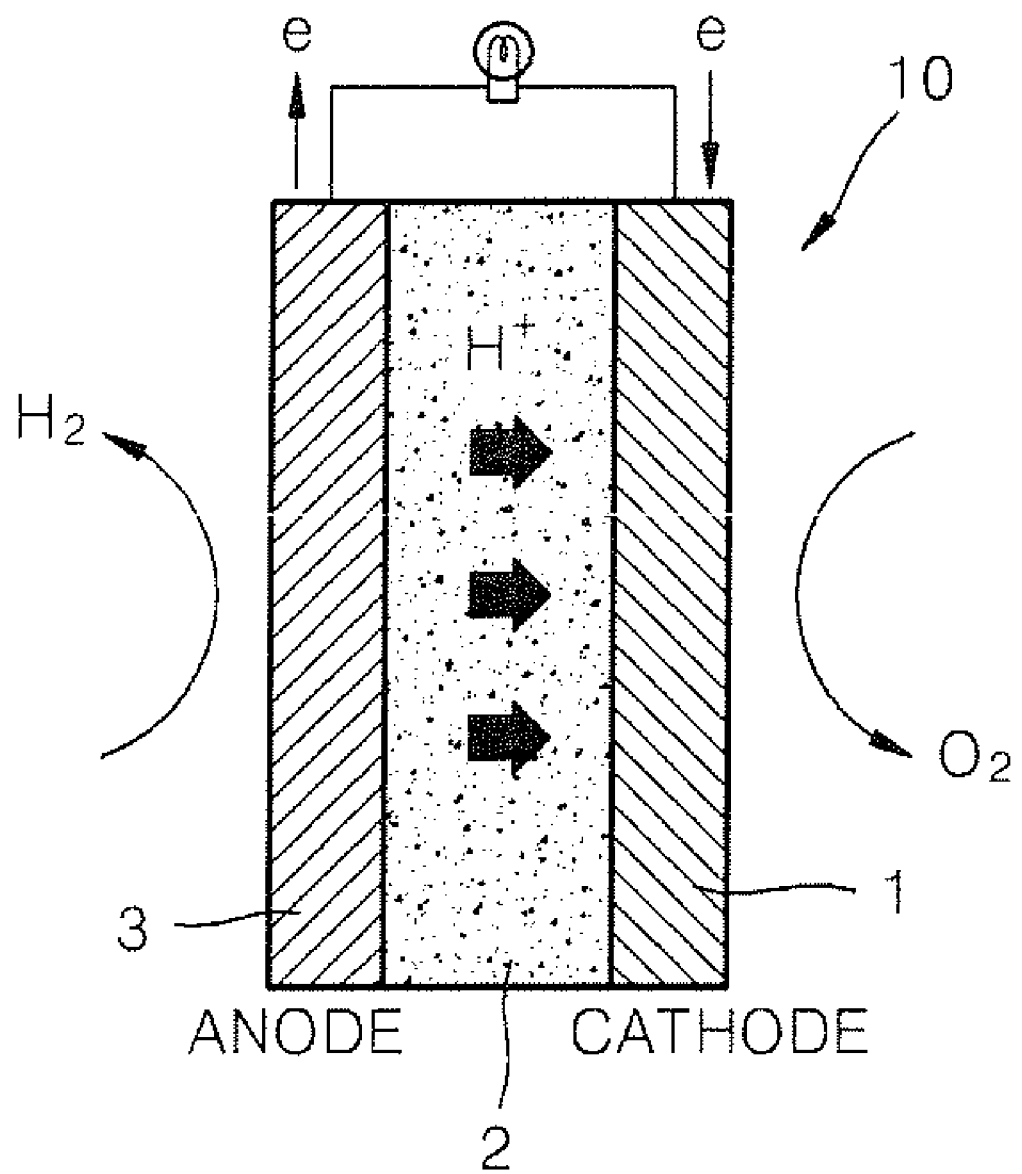
FIG. 1 is a schematic drawing illustrating the energy transformation structure of a conventional fuel cell.
Figure 2:
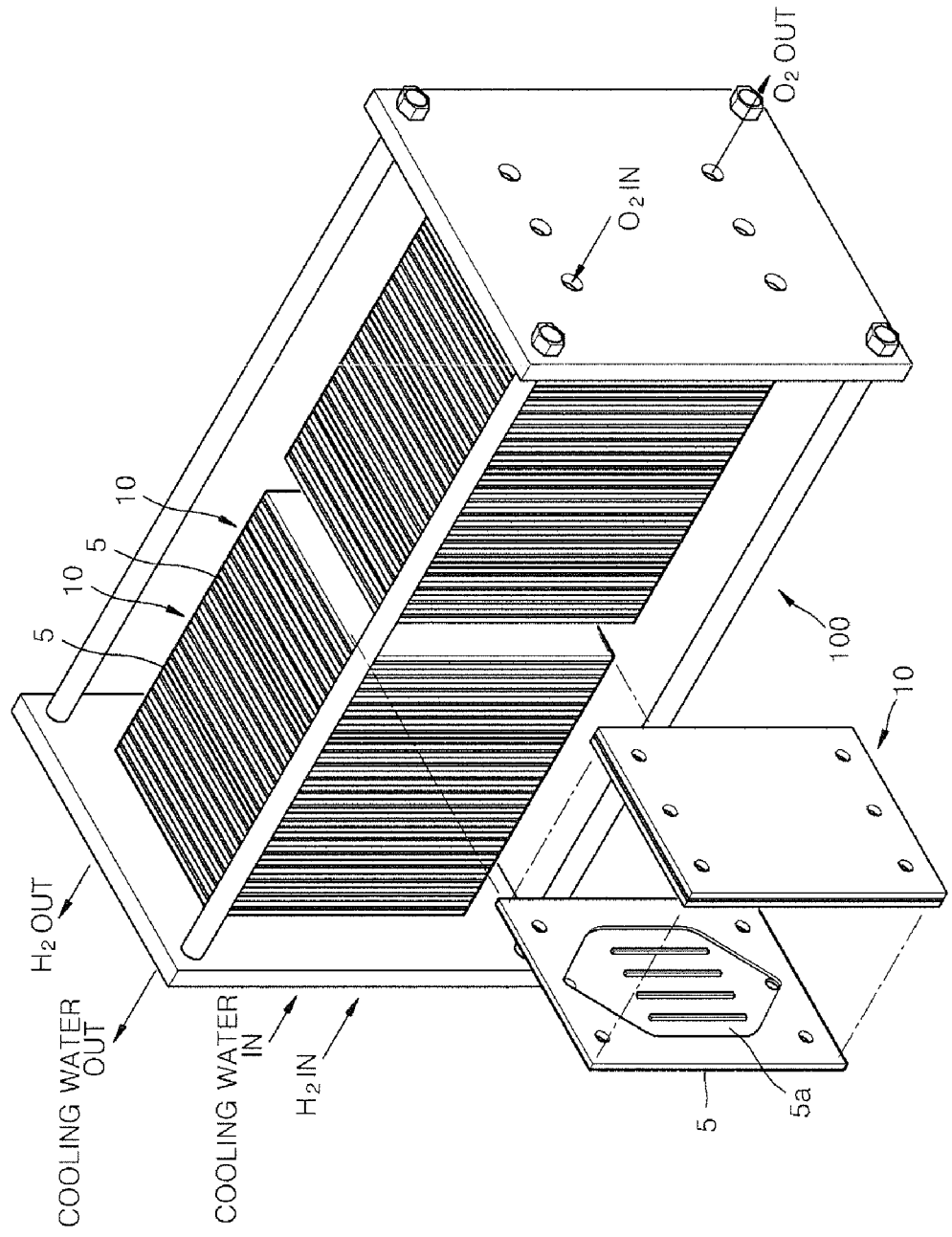
FIG. 2 is a perspective view of a conventional stack structure of a fuel cell.
Figure 3:
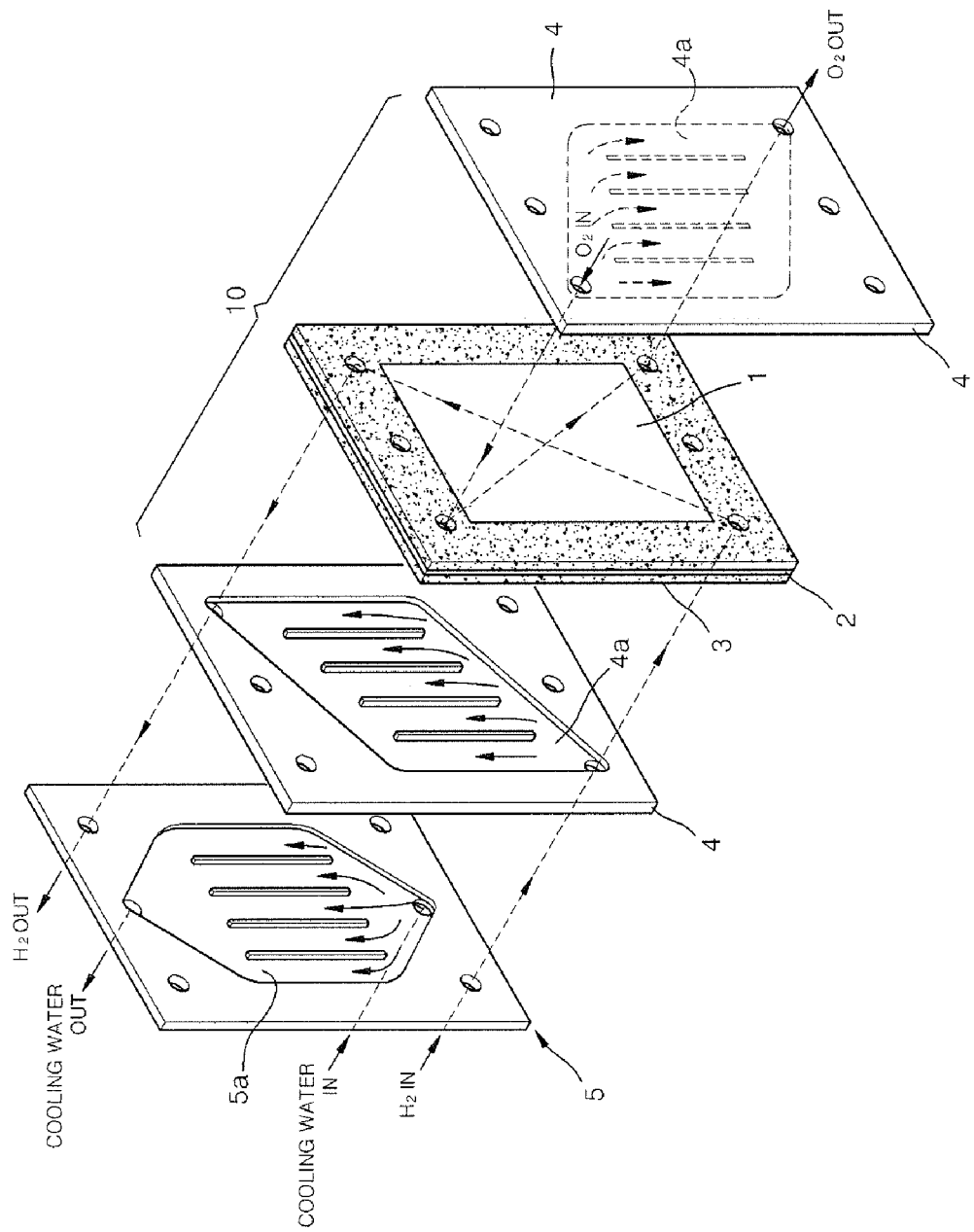
FIG. 3 is an exploded perspective view of a conventional unit cell structure of a fuel cell.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 5:
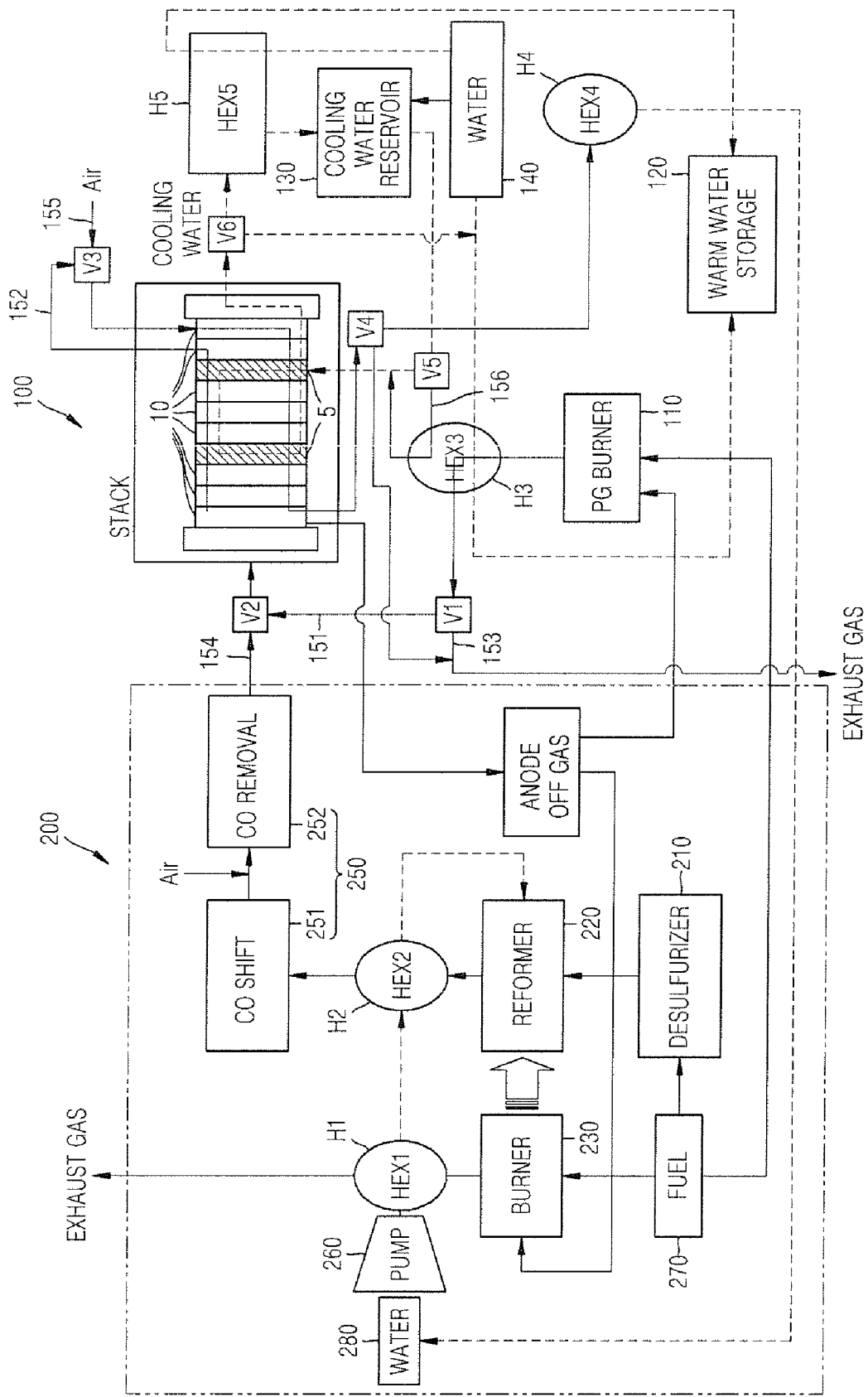
FIG. 5 is a block diagram of a fuel cell system according to an embodiment of the present invention.

FIG. 5 is a block diagram of a fuel cell system according to an embodiment of the present invention. The fuel cell system has a structure in which a fuel processor 200 generates hydrogen to supply it to a stack 100, and electricity is generated in the stack through an electrochemical reaction using the hydrogen supplied from the fuel processor 200.

Figure 4:
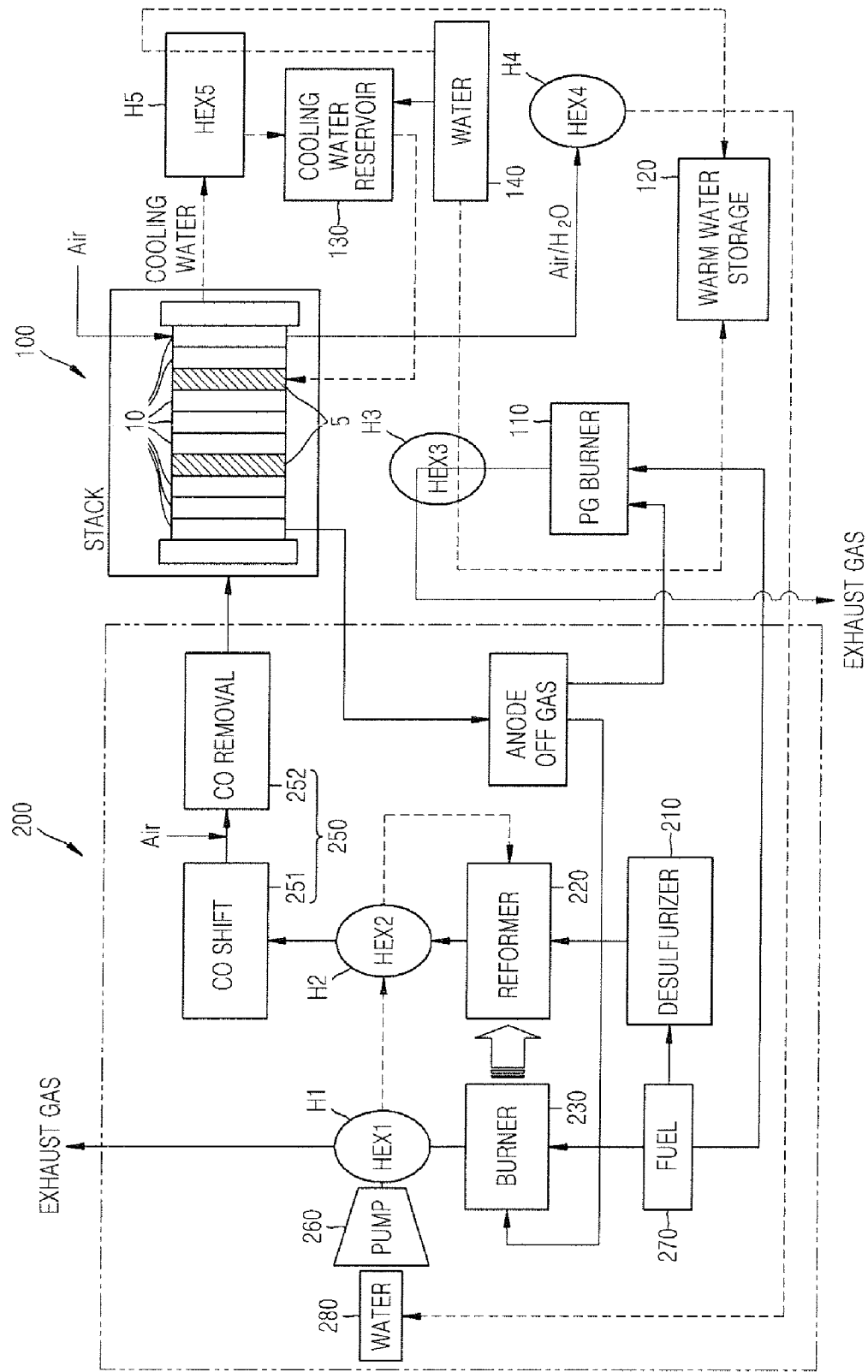
FIG. 4 is a block diagram of a conventional fuel cell system.

The fuel processor 200 has many of the same elements and connection structure as the fuel processor 200 depicted in FIG. 4, and thus, the detailed description thereof will be omitted.

Also, other elements of the fuel cell system including the stack 100 are similar to those of the conventional fuel cell system. However, in the present embodiment, connection structures between the stack 100 and peripheral elements are improved to provide rapid heating of the stack 100 during start up of the fuel cell system. An aspect of the present embodiment is that a new function for rapid heating of the stack 100 during a start up operation is added by modifying the connection structure between the stack 100 and peripheral elements without changing the conventional constituent elements.

A cooling water circulating unit that dissipates heat generated during an electrochemical reaction is provided around the stack 100. The cooling water circulating unit has a structure such that heat in the stack 100 is absorbed by cooling water supplied to cooling plates 5 in the stack 100 from a cooling water storage tank 130, and the cooling water that absorbs heat in the stack 100 is cooled in a heat exchanger H5 by secondary cooling water stored in a water tank 140. The cooled cooling water returns to the cooling water storage tank 130.

In a normal operation, a process burner 110 is operated mainly using surplus hydrogen that was not consumed in an anode electrode of the stack 100. During the start up operation, hydrogen generated in the fuel processor 200 cannot be supplied to the anode electrode of the stack 100 until the temperature of the stack 100 reaches an operating temperature. Accordingly, during this period, the process burner 110 is operated by directly supplying hydrogen, or a hydrocarbon, to heat water supplied from the water tank 140, and the heated water is supplied to the stack 100 through a heat exchanger H3. Water heated by the process burner 110 is conveyed to a warm water storage 120 so as to be used for extraneous purposes.

Up to this point, the fuel cell system according to the present embodiment is similar to the conventional fuel cell system depicted in FIG. 4. However, the fuel cell system according to the present embodiment further includes a first heating structure in which an exhaust gas from the process burner 110 is directly supplied to the stack 100 to rapidly heat the stack 100 and a second heating structure in which water in the cooling water storage tank 130 is heated using the process burner 110 to pass through the stack 100.

In a conventional fuel cell system, the exhaust gas from the process burner 110 is discharged to the outside after passing through the heat exchanger H3 to heat the water that is supplied to the warm water storage 120 in. However, in the present embodiment, the exhaust gas can be selectively injected into the stack 100 by manipulating a valve. A first valve V1 allows the exhaust gas to be discharged to the outside through an exhaust gas line 153 or to be supplied to a hydrogen supply line 154 through an exhaust gas connection line 151. A second valve V2 allows hydrogen supplied from the fuel processor 200 to be supplied to the stack 100 or the exhaust gas of the process burner 110 supplied through the exhaust gas connection line 151 to be supplied to the stack 100. When the first and second valves V1 and V2 are set to an exhaust gas supply mode, the exhaust gas of the process burner 110 passes through the stack 100 along the hydrogen path, that is along the same path that is taken by hydrogen through the stack 100. The exhaust gas that has completely passed through the stack 100 along the hydrogen path may be selectively directed to re-enter the stack 100 along an air path line by the manipulation of a third valve V3. For example, the exhaust gas that has passed through the stack 100 may be mixed with an oxygen source to be supplied to a cathode electrode in the stack 100 in an air line 155 through an exhaust gas connection line 152. As is well known in the art, hydrogen passes through the unit cells stacked in the stack 100 while contacting the anode electrode, and air for the oxygen source passes through the unit cells while contacting the cathode electrode. Accordingly, the exhaust gas from the process burner 110 can pass through both the hydrogen and air paths when the first through third valves V1, V2, and V3 are appropriately manipulated. The exhaust gas that has completely passed through the stack 100 is discharged to the outside via a fourth valve V4. In a normal operation, air that was supplied to the cathode electrode instead of the exhaust gas reaches the fourth valve V4. At this point, by manipulating the fourth valve V4, the air may be induced to travel through a fourth heat exchanger H4 that allows for moisture contained in the air to be recovered.

A structure that heats and supplies cooling water to the stack 100 includes a cooling water connection line 156 that guides cooling water of the cooling water storage tank 130 to pass through the heat exchanger H3, which is heated by the process burner 110, and a fifth valve V5 that is mounted on a branch point from a main cooling water stream. That is, in a normal operation, the cooling water from the cooling water storage tank 130 enters the cooling plates 5 of the stack 100 along the main cooling water stream. However, by manipulating the fifth valve V5, the cooling water can be supplied to the cooling plates 5 after being heated to a high temperature by passing through the heat exchanger H3. In this way, high temperature cooling water can heat up the stack 100 by flowing through flow channels of the cooling water. As used herein, the term "cooling water" refers generally to any water that is passed through the stack 100, whether the water is at a cool or ambient temperature or is heated. Without a modifier, the term "cooling water" as used herein refers generally to water that has not been heated, such as, for example, cooling water that is performing the typical function of cooling the stack 100. The term "heated cooling water" and "high temperature cooling water" refer to cooling water that has been heated before being directed to the stack 100. The heated cooling water that has passed through the stack 100 can be conveyed to the warm water storage 120 or to the cooling water storage tank 130 by the control of a sixth valve V6. In this way, the cooling water is heated to a high temperature and supplied to the stack 100 when necessary.

The fuel cell system having the above structure can be operated using a method as follows. When rapid heating of the stack 100 is necessary, such as, for example, during a start up operation, the first through sixth valves V1 through V6 are controlled to be set to rapid heating positions. That is, the first through sixth valves V1 through V6 are controlled so that the exhaust gas from the process burner 110 and the heated cooling water can enter the stack 100. In this case, the exhaust gas heats the stack while passing through hydrogen and oxygen paths and the heated cooling water, which has been heated at the heat exchanger H3, heats the stack 100 while passing through the cooling water pass lines. As a result, the stack 100 is rapidly heated, since the high temperature exhaust gas and the heated cooling water simultaneously heat the stack 100. In the prior art, heated cooling water is supplied to the stack 100 after heating the cooling water storage tank 130 using an electric heater. In the present embodiment, since the stack 100 is simultaneously heated by the high temperature exhaust gas and the heated cooling water, the stack 100 can be heated much faster than in the conventional art, in which heated cooling water is supplied to the stack 100 after heating the cooling water storage tank 130 using an electric heater. Experiments performed in this regard show that in the conventional art, it takes almost an hour for the stack 100 to reach a normal operating temperature, such as, for example, 120° C., but in the present embodiment, it takes approximately 30 minutes to reach the normal operating temperature. Accordingly, a normal operation of a fuel cell system can be achieved in one-half the warming up time of the conventional art.

When the stack 100 reaches an appropriate temperature by the initial heating up process, the first through sixth valves V1 through V 6 are controlled to be in a normal operation position. That is, the supply of the exhaust gas and the heated cooling water to the stack 100 is stopped, and hydrogen, oxygen, and cooling water are supplied to the stack 100. From this point, a normal electrochemical reaction for generating electricity is carried out in the stack 100, which is heated to an appropriate temperature.

In this way, a fuel cell system that can rapidly heat the stack 100 using exhaust gas and heated cooling water is provided. It is to be understood that the method of operating the fuel stack as described herein may be automated.

A fuel cell system according to aspects of the present invention has the following advantages.

First, when rapid heating of a stack is necessary, such as, for example, during a start up operation, the time required for the fuel cell system to reach a normal operation temperature can be greatly reduced, since the stack can be simultaneously heated using high temperature exhaust gas and heated cooling water.

Second, the rapid heating system can be readily provided in an existing fuel cell system, since only connection structures between constituent elements are modified, and the constituent elements themselves are maintained in the existing fuel cell system, thereby reducing costs for modification.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell system comprising:
   a stack in which an electrochemical reaction occurs between hydrogen and oxygen;
   a fuel processor that produces hydrogen to be supplied to the stack from a fuel source;
   a process burner that is operated using the fuel source or surplus hydrogen that was not consumed in the stack and that generates a process burner exhaust gas;
   hydrogen and oxygen flow lines that pass through the stack; and
   a first heating structure that increases an internal temperature of the stack by passing exhaust gas of the process burner through the stack in the hydrogen flow line and then redirecting the exhaust gas of the process burner that has passed through the stack in the hydrogen flow line to pass through the stack in the oxygen flow line.

2. The fuel cell system of claim 1, further including:
   an exhaust gas flow line that directs the process burner exhaust gas to a process burner exhaust gas outlet; and
   wherein the first heating structure comprises an exhaust gas connection line that connects the exhaust gas flow line of the process burner to the hydrogen flow line and at least one valve such that the exhaust gas is selectively directed either through the stack or to the process burner exhaust gas outlet.

3. The fuel cell system of claim 1, wherein the first heating structure includes a first valve and a second valve, wherein the first valve selectively directs process burner exhaust gas to the process burner exhaust gas outlet or to the second valve and the second valve selectively directs either hydrogen from the fuel processor or process burner exhaust gas through the hydrogen flow line of the stack.

4. The fuel cell system of claim 3, further including a third valve that selectively directs only process burner exhaust gas that has passed through the stack in the hydrogen flow line of the stack to pass through the stack in the oxygen flow line of the stack or directs only air to pass through the oxygen flow line of the stack or directs both process burner gas that has passed through the stack in the hydrogen flow line of the stack and air to pass through the oxygen flow line of the stack.

5. The fuel cell system of claim 4, further including a fourth valve that selectively directs process burner exhaust gas or air that has passed through the oxygen flow line of the stack to the process burner exhaust gas outlet or to a water recovery unit.

6. The fuel cell system of claim 1, further comprising
   a cooling water circulating unit that provides cooling water to the stack; and
   a second heating structure that increases the internal temperature of the stack by heating cooling water by heat exchange with the process burner exhaust gas and passing the heated cooling water through the stack.

7. The fuel cell system of claim 6, wherein:
   the cooling water circulating unit includes a main cooling water line that directs cooling water into the stack; and
   the second heating structure comprises a cooling water connection line that separates cooling water from the main cooling water line for heat exchange with the process burner exhaust gas and that circulates the heated cooling water heated by the heat exchange to the main cooling water line such that the heated cooling water is directed into the stack and at least one cooling water valve such that the cooling water from the main cooling water line or the heated cooling water is selectively directed through the stack.

* * * * *